US006421170B1

United States Patent
Krol et al.

(10) Patent No.: US 6,421,170 B1
(45) Date of Patent: Jul. 16, 2002

(54) GAIN CONTROL AND SHAPING OF EDFAS VIA DUAL CAVITY GAIN CONTROL

(75) Inventors: Mark F. Krol; Yongqian Liu, both of Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/373,308

(22) Filed: Aug. 12, 1999

Related U.S. Application Data

(60) Provisional application No. 60/101,027, filed on Sep. 18, 1998.

(51) Int. Cl.$^7$ .............................. H01S 3/13; H01S 3/106
(52) U.S. Cl. ...................................... 359/337.1; 359/341
(58) Field of Search ................................ 333/227, 231; 359/337, 341, 346; 372/94, 97

(56) References Cited

U.S. PATENT DOCUMENTS

| 5,088,095 A | * | 2/1992 | Zirngibl ........................... 372/6 |
| 5,155,780 A | * | 10/1992 | Zirngilbl ....................... 385/27 |
| 5,239,607 A | * | 8/1993 | da Silva et al. ............. 385/122 |
| 5,861,981 A | * | 1/1999 | Jabr ............................ 359/341 |
| 5,872,649 A | * | 2/1999 | Byron et al. ................. 359/341 |
| 5,991,068 A | * | 11/1999 | Massicott et al. ........... 359/337 |
| 6,008,932 A | * | 12/1999 | Luo et al. .................... 359/337 |

OTHER PUBLICATIONS

Zirngibl, M., 'Gain Control in Erbium–Doped Fibre Amplifiers by an All–Optical Feedback Loop', Electronics Letters, Mar. 1991, vol. 27, No. 7, pp. 560–561.*

Yu, A., O'Mahony, M.J., 'Propersties of Gain Controled Erbium Doped Amplifiers by Lasing', Electronics Letters, Aug. 1995. vol. 31, No. 16, pp. 1348–1349.*

Cai, M., Liu, X., Cui, J., Tang, P., Peng, J., 'Study on Noise Characteristic of Gain–Clamped Erbium–Doped Fiber–Ring Lasing Amplifier', IEEE Photonics Technology Letters, Aug. 1997, vol. 9, No. 8, pp. 1093–1095.*

Bryce, J., Yoffe, G., Zhao, Y., Minasian, R., 'Tuanable, Gain–Clamped EDFA Incorporating Chriped Fibre Bragg Grating', Electronics Letters, Aug. 1998, vol. 34, No. 17, pp. 1680–1681.*

* cited by examiner

Primary Examiner—Thomas H. Tarcza
Assistant Examiner—Deandra Hughes
(74) Attorney, Agent, or Firm—William Greener; Svetlana Short

(57) ABSTRACT

The present invention relates to an optical amplifier system in which multiple laser cavities are utilized to control the gain of an erbium doped fiber amplifier (EDFA). More specifically, the present invention is directed to an optical amplifier comprising a gain medium such as an erbium doped optical fiber which provides gain for an optical signal propagating therein. The gain medium also provides gain for a plurality of laser cavities (e.g. first and second laser cavities) which simultaneously oscillate at individual (e.g. first and second) wavelengths. The inventive optical amplifier results in reduced variation in gain spectrum as a function of input signal power, as a function of wavelength, and as a function of time. By varying the optical attenuation in one or more of the individual laser cavities it is possible to vary the gain spectrum of the gain medium at the corresponding individual wavelength and this controls the shape of the gain spectrum of the gain medium.

22 Claims, 7 Drawing Sheets

GAIN CONTROL AND SHAPING OF EDFAS VIA DUAL CAVITY GAIN CONTROL

This Application claims Benefit of Provisional application Ser. No. 60/101,827 filed Sep. 18, 1998.

FIELD OF THE INVENTION

The present invention relates to an optical amplifier system in which multiple laser cavities are utilized to control the gain of an erbium doped fiber amplifier (EDFA). More specifically, the present invention is directed to an optical amplifier comprising a gain medium such as an erbium doped optical fiber which provides gain for an optical signal propagating therein. The gain medium also provides gain for a plurality of laser cavities (e.g. first and second laser cavities) which simultaneously oscillate at individual (e.g. first and second) wavelengths. The inventive optical amplifier results in reduced variations in gain spectrum as a function of input signal power, as a function of wavelength, and as a function of time. By varying the optical attenuation in one or more of the individual laser cavities it is possible to vary the gain spectrum of the gain medium at the corresponding individual wavelength and thus control the shape of the gain spectrum of the gain medium.

BACKGROUND OF THE INVENTION

Dense wavelength division multiplexed (DWDM) optical networks have been widely accepted as the choice for next generation, high capacity transmission systems. The successful operation of such systems will require optical amplifiers such as erbium doped fiber amplifiers (EDFAs) that can provide uniform and stable gain for optical signals. Such demands have led to various techniques to engineer amplifiers with these characteristics. Because the intrinsic gain profile of an EDFA is not uniform, two approaches have been used to obtain a flat gain spectrum over the signal band. The first approach modifies the gain medium to reduce the intrinsic gain ripple. An example of this is the development of the erbium doped fluoride fiber amplifier (EDFFA), which provides less gain ripple than an erbium doped silica fiber amplifier (EDSFA). The second approach incorporates external devices to correct gain profiles. These devices can be either active or passive ones. Current devices for gain spectrum shaping are mostly passive filters that tailor the gain spectrim into a flat top.

In addition, future wavelength division multiplexed optical networks will require erbium doped fiber amplifiers that can provide constant gain regardless of the total input signal power, e.g. number of channels present. Recently, several techniques have been shown to provide relatively good automatic gain control in optical amplifiers. Typically, the techniques can be classified into two distinct groups: the first, electrical automatic gain control (EAGC) and the second, optical automatic gain control (OAGC). In OAGC, a single laser cavity is formed in either a ring or standing wave configuration. In spite of its success, signal band inhomogeneity results in relatively large gain variations (as much as 1 dB) when signal power is changed, e.g. in the presence of channel add/drops. Such unwanted gain changes could impose serious system penalties in communication networks.

In addition, in wavelength division multiplexed networks, temporal (or relaxation) oscillations in the gain spectrum result when one of the wavelengths is dropped (or added). These oscillations in the gain spectrum in turn result in relaxation oscillations in the amplitudes of the surviving wavelengths. Such relaxation oscillations are undesirable in optical communication systems.

In view of the foregoing, it is an object of the invention to provide an optical amplifier in which variations in the gain spectrum in response to changes in signal input power are reduced. More particularly, it is an object of the invention to provide an optical amplifier in which the gain is relatively constant, regardless of changes in total input signal power due to the adding or dropping of channels.

It is also an object of the invention to provide an optical amplifier system in which variations in gain spectrum as a function of wavelength and as a function of time are reduced so as to increase uniformity and stability of gain across the optical signal band.

It is a further object of the invention to provide an optical amplifier in which it is possible to control the shape of the gain spectrum in the optical signal band.

SUMMARY OF THE INVENTION

In accordance with an illustrative embodiment of the invention, an optical amplifier comprises a gain medium, such as an erbium doped optical fiber, for providing optical gain to an optical signal propagating therein. A pump laser is coupled to the gain medium.

The gain medium provides gain for first and second laser cavities coupled thereto. The cavities may be ring cavities or linear cavities. The following description pertains to a ring cavity. The first cavity includes a first filter transmissive at a first optical wavelength and a first optical attenuator which may be variable. The second cavity includes a second filter transmissive at a second optical wavelength and a second optical attenuator which may be variable. The first laser cavity oscillates at the first optical wavelength and the second laser cavity simultaneously oscillates at the second optical wavelength. Both the first and second wavelengths are in the signal band of the gain medium. In this case, the first optical attenuator compensates for the gain of the gain medium at the first optical wavelength and the second optical attenuator simultaneously compensates for the gain of the gain medium at the second optical wavelength. The first and second simultaneously oscillating laser cavities reduce variations in the gain of the gain medium both as a function of input signal power, e.g., when channels are added or dropped, as a function of wavelength (i.e. across the signal wavelength band), and as a function of time, (i.e. relaxation oscillations in surviving wavelengths are reduced when one wavelength is dropped in a multiple wavelength system).

In an alternative embodiment, additional laser cavities; which oscillate at additional wavelengths in the signal band, are coupled to the gain medium.

The inventive optical amplifier may be operated so as to control the shape of the gain spectrum of the gain medium across the signal wavelength band. The method comprises the step of varying the variable optical attenuator in one or more of the laser cavities coupled to the gain medium. This in turn causes a variation in the gain of the gain medium at the corresponding wavelength and nearby wavelengths via spectral inhomogeneity.

DETAILED DESCRIPTION OF THE INVENTION

Figure 1:
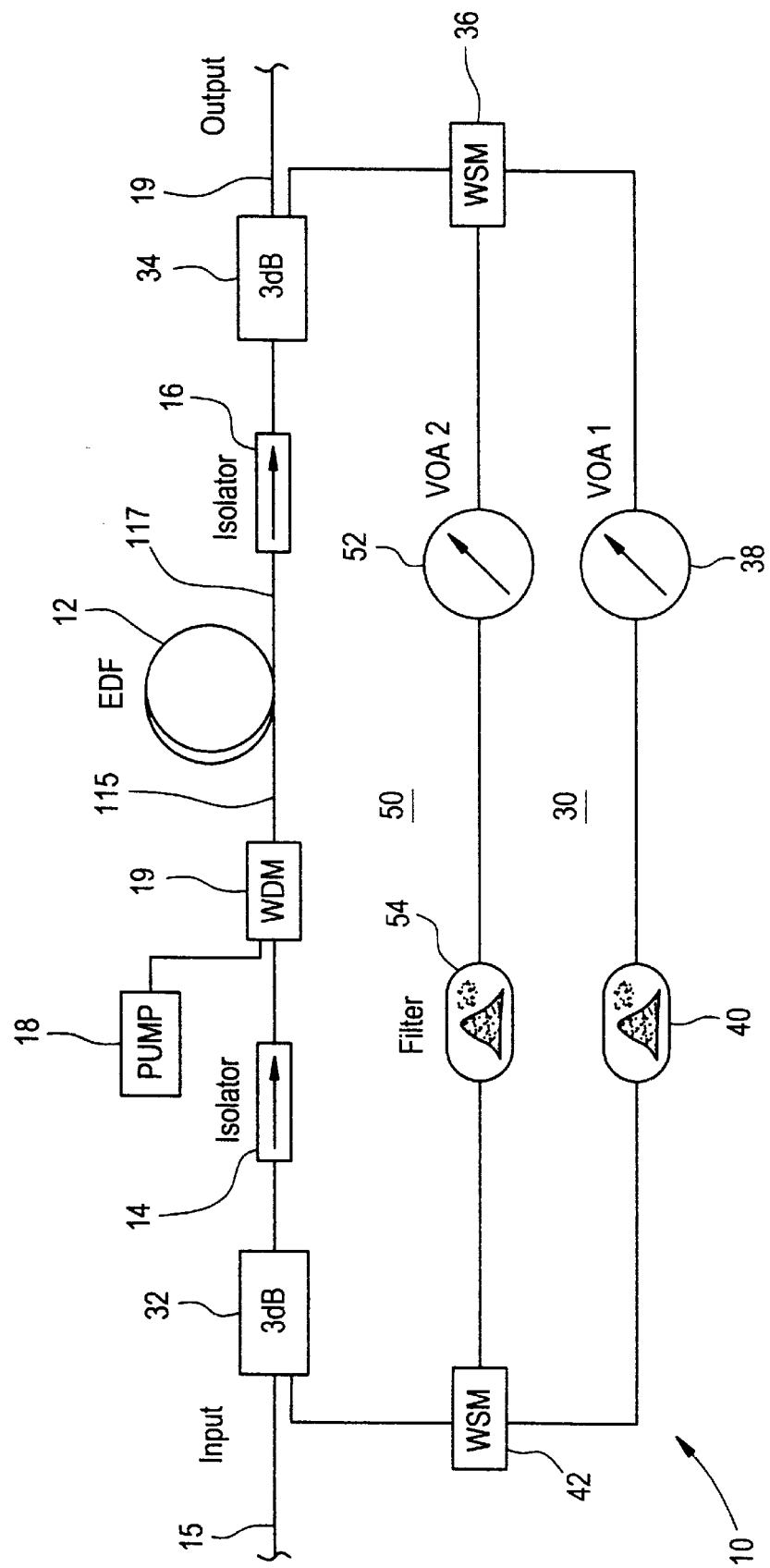
FIG. 1 schematically illustrates an optical amplifier in accordance with an illustrative embodiment of the present invention.

An embodiment of an optical amplifier in accordance with the present invention is shown in FIG. 1 The optical amplifier 10 of FIG. 1 comprises a gain medium in the form of a coil of an erbium doped fiber (EDF) 12, for providing gain to an optical signal propagating therein. Illustratively, the fiber is an erbium doped fluoride fiber (EDFF) or an erbium doped silica fiber (EDSF). An input isolator 14 is coupled to an input end 115 of the erbium-doped fiber 12. An output isolator 16 is coupled to an output end 117 of the erbium-doped fiber 12. A pump laser 18 is coupled to the fiber 12 via the wavelength division multiplexer (WDM) 19. Illustratively, the fiber 12 is an aluminum silicate erbium doped fiber having a length of 14 m. The signal band is 1528 nm to 1565 nm. The pump laser 18 has a wavelength of 976 nm at a maximum power of 140 mw.

The optical signal to be amplified enters the amplifier 10 at the input port 15 and the amplified optical signal exits the amplifier 10 at the output port 17.

The erbium doped fiber gain medium 12 provides gain for first and second ring laser cavities 30, 50. The ring laser cavity 30 comprises the 3 dB coupler 32, the erbium doped fiber 12, the 3 dB coupler 34, the relatively coarse wavelength selective multiplexer (WSM) 36, a first variable optical attenuator (VOA1) 38, a first wavelength selective filter 40, and the WSM 42.

Similarly, the ring laser cavity 50 comprises the 3 dB coupler 32, the erbium doped fiber 12, the 3 dB coupler 34, the WSM 36, a second variable optical attenuator (VOA2) 52, a second wavelength selective filter 54 and the WSM 42.

The 3 dB couplers 32, 34 are used to provide feedback for the ring laser cavities 30, 50. Optical gain is provided to both ring laser cavities 30, 50 by the gain medium in the form of fiber 12.

The WSM devices 36, 42 break up the two cavities so that the cavity 30 oscillates in the blue band (1520 nm–1530 nm) and the cavity 50 oscillates in the red band (1520 nm–1 535 nm). The narrow band filters 40 and 54 are peaked at $\lambda_1$, =1530 nm and $\lambda_2$=1565 nm, respectively, to avoid mode hopping and maintain the stability of each cavity. The exact wavelength is not critical for the operation of the amplifier. The two laser cavities 30, 50 oscillate simultaneously. This is accomplished by adjusting the round trip gain of each cavity 30, 50 by adjusting VOA1 and VOA2 such that the round trip loss compensates the amplifier gain at each wavelength.

Figure 2:
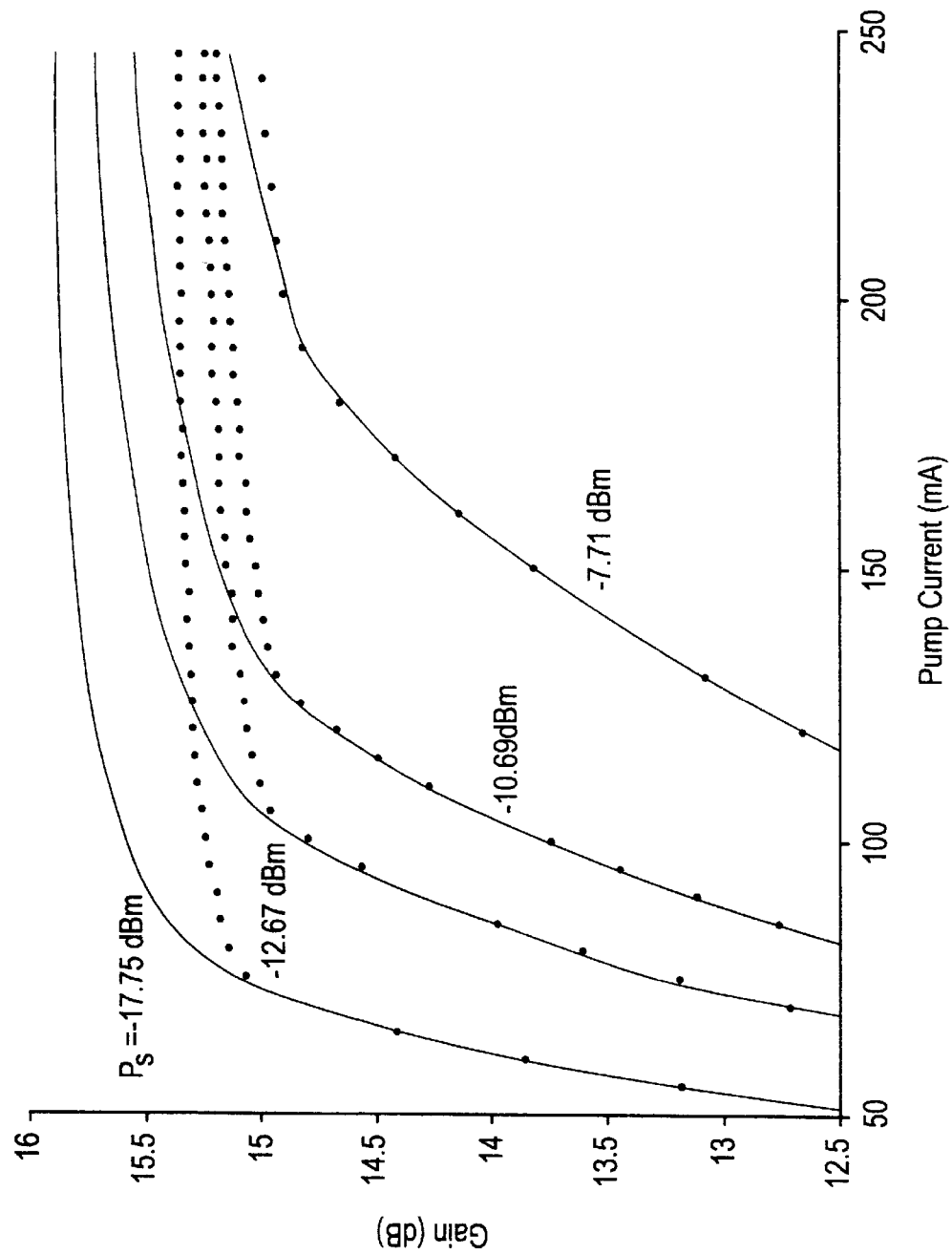
FIG. 2 is a plot of amplifier gain as a function of pump current for the inventive optical amplifier.

The following describes an experiment which shows how the inventive optical amplifier exhibits reduced gain variations as a function of signal input power. The experiment may be understood in connection with FIG. 2 which plots gain versus pump current for a single laser cavity system (solid lines) and a dual laser cavity system (solid circle symbols). In the case of a single laser scheme (in this case the blue laser cavity), a purely homogenous gain medium requires the gain at a particular wavelength to be fixed regardless of the signal power, provided enough pump power is available to keep the laser above threshold. However, in an actual EDFA with a single laser cavity, spectral inhomogeneities result in a "soft" threshold as shown in FIG. 2 by the solid lines; in other words, the gain at a particular wavelength is signal power dependent even when the laser is above threshold. In FIG. 2, the signal wavelength was 1550 nm and the four solid curves correspond to signal powers of −17.75, −12.67, −10.69, and −7.71 dBm. The signal power dependence of the individual channel gains results in the observed variability of the gain spectrum. At the maximum pump current, the signal gain changes by as much as 0.9 dB over the range of the above input powers. When the second laser cavity (the red laser) is added to the system, however, the sensitivity of the gain spectrum to signal power is greatly reduced as shown by the solid circles in FIG. 2. The signal gain changes by only 0.4 dB when both lasers are oscillating. In fact, due to the dramatic gain clamping slope changes, the differences in gain variations under the single and dual cavity gain control would be even larger at a higher pump power.

Figure 3:
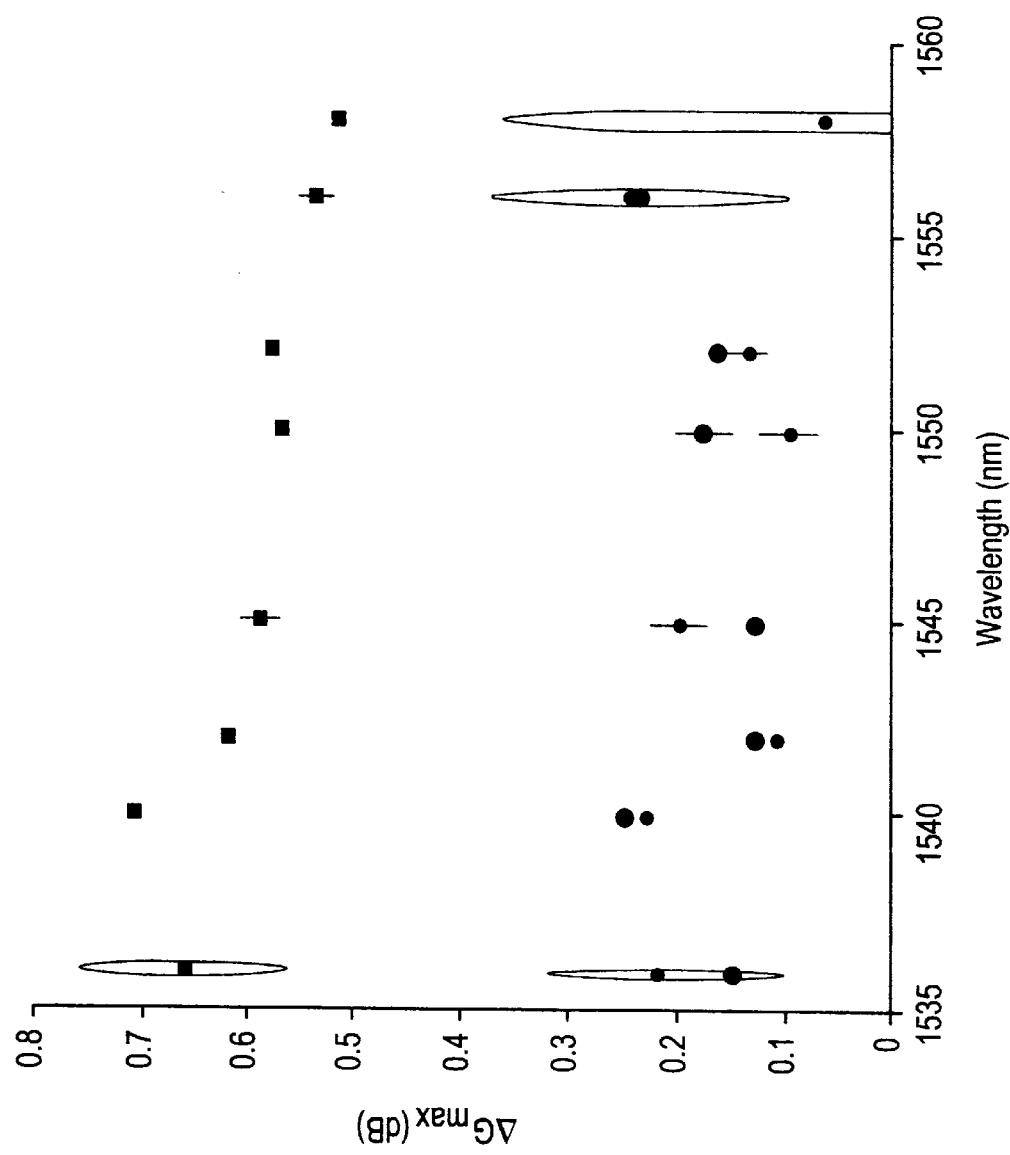
FIG. 3 shows a plot of gain variation (ΔG) as a function of wavelength for the inventive optical amplifier.

The variability of the amplifier gain spectrum was investigated in more detail using an eight-wavelength gain measurement technique. Using eight-wavelengths in the signal band and the ability to turn individual channels on and off, the adding and dropping of channels was simulated. By measuring the gain of the surviving channels under each channel loading condition we obtained an accurate estimate of the gain variability. The results are shown in FIG. 3 which is a plot of changes in gain (ΔG) versus wavelength. The input power of each channel was approximately −16 dBm (−7 dBm total). The solid squares are for the single cavity case (blue laser). The variability ranges from a minimum of 0.5 dB to a maximum of 0.7 dB across the signal band. The dual cavity case is shown by the solid circles. Clearly the gain variability is greatly reduced to a value approaching 0.15 dB across the entire band.

The following is a qualitative explanation of why the inventive dual cavity optical amplifier effectively reduces the gain variability. When channels are either added or dropped in the single cavity case, the laser power changes to accommodate the change in input power. Of course there is a spectral hole burned by the laser; however, the gain at the lasing wavelength does not decrease for increasing laser power, the gain at wavelengths around the lasing wavelength increases. When the additional lasing wavelength is added via an independent cavity, the gain is locked at an additional wavelength of the gain spectrum. Since the spectral holes observed in the erbium-in-silica system are generally broad, particularly in the red band, the addition of a second lasing signal clamps the gain over a broader spectral region.

Figure 4:
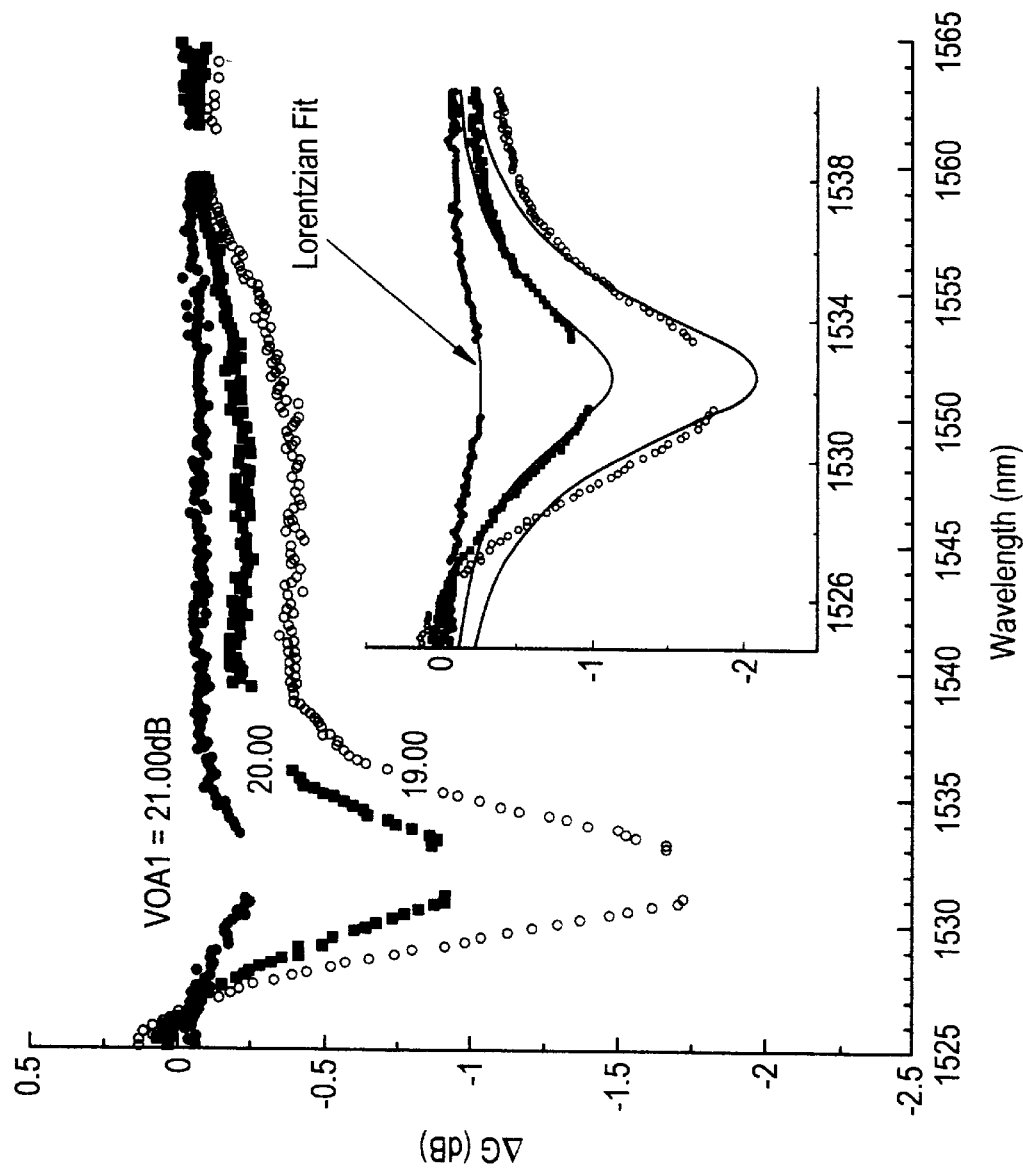
FIG. 4 and FIG. 5 are plots which show variations in gain at a particular wavelength in response to varying the optical attenuator in the corresponding laser cavity of the inventive optical amplifier.
Figure 5:
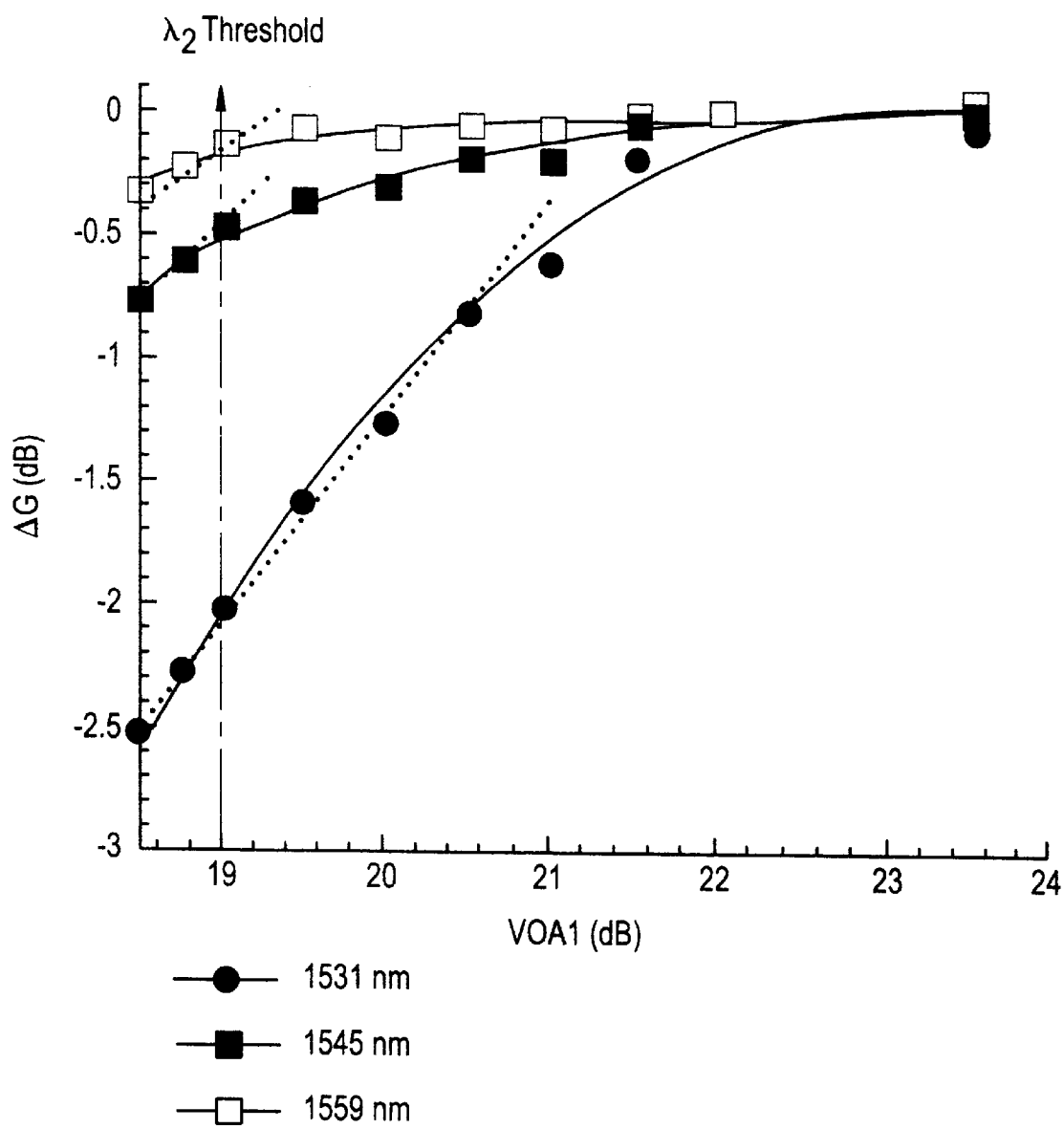

In the experiment described below, the inventive optical amplifier with two laser cavities is utilized. Here we operated a type II Er doped silica fiber with a 0.69 average inversion, a total gain of about 16 dB, and gain ripple of around 8 dB. We first take a reference gain spectrum by setting the blue laser just below its lasing threshold. We then measure the gain spectrum at different VOA1 settings with VOA2 fixed. The difference between the measured gain spectra and the reference gain spectrum is shown in FIG. 4 for three VOA1 settings. With increasing blue laser power as VOA1 is decreased, the spectral hole at λ1 (=1532 nm in this case) also becomes deeper thus affecting the gain spectrum in the blue band dramatically. The spectral hole profiles can be fitted with a Lorentzian lineshape as shown in the inset of the figure. Because of the finite width of the spectral hole burned from the laser (FWHM <7 nm), the gain spectrum is changed most dramatically in the blue band, in this case by as much as 2.5 dB. The gain spectrum changes in the red band, however, are much smaller (<0.5 dB). This is evident in FIG. 5, which shows the gain changes at three different wavelengths as a function of VOA1. Above the lasing threshold of the red laser, the gain at 1531 nm decreases linearly with VOA1 when the blue laser is above threshold. Gains at 1545 nm and 1559 nm, however, change much more slowly until the red laser drops below threshold.

We have demonstrated the gain spectrum shaping capability of the inventive optical amplifier in the case where the gain medium is an EDSF, through the adjustment of the control laser gain. It is expected that this technique can also be used in conjunction with a passive filter element, when the gain medium is an EDSFA or independently, when the gain medium is an EDFF, to flatten th gain spectrum. The justification for using the EDFF is: 1) erbium doped fluoride fibers exhibit broader spectral holes than erbium doped silica fibers, and 2) even smaller gain ripples can be achieved without the use of gain flattening devices (see e.g. J. W. Sulhoff, et al, *IEEE Photon. Tech.* Letts. 9, 1578–1579 (1997). Therefore, the laser induced spectral hole profiles can match the gain profile more easily in EDFFAs to obtain a flat gain spectrum.

An additional experiment shows that the inventive optical amplifier reduces temporal variations in the gain spectrum of an erbium doped optical fiber. In this experiment, we enable or disable a selected cavity to evaluate the performance of the amplifier under input changes. The transient response of the surviving channel depends on the following factors. First, it depends on the placement of the channel position and control laser wavelengths: $\lambda_1$, $\lambda_2$ (control wavelengths), $\lambda_M$ (add/drop channel),$\lambda_s$ (surviving channel). Second, it depends on the power level of all the present channels and control lasers. Last, it depends on the amplifier design (number of coils and passive loss etc.). The power levels and amplifier design will mainly affect the magnitude of change and frequency. The placement of the channel and control laser position will greatly influence the transient shape, in particular, the relative ratio of the steady state change and relaxation oscillations.

To illustrate a general result, we select the control lasing wavelengths at $\lambda_1$=1532 nm and $\lambda_2$ at 1560 nm. The inputs to the amplifier are $\lambda_M$=1545 nn and $\lambda_s$=1550 nm. We simulate the adding and dropping of $\lambda_M$ by modulating its power at $f_M$=1 kHz. In order to look at the strongest effect of add/drop to a single amplifier, the surviving channel power was set at 0 dBm and the average power of the add/drop channel was set at 1 dBm.

Three cases were studied in detail to compare the performance of the single and dual cavity OAGC. Namely, the operation of the amplifier with: a single control laser at $\lambda_1$, a single control laser at $\lambda_2$, and dual control lasers at both $\lambda_1$ and $\lambda_2$. The operation of the dual control lasers is accomplished by carefully adjusting the round trip loss of each cavity (VOA1 and VOA2) to properly balance the power between the two control lasers. The range of the dual lasing mode is determined by the spectral hole depth at each lasing wavelength as well as by the number of photons supplied by the pump or depleted by the signals. In the experiment described below in connection with FIG. 6, the data shown are obtained under an optimized balance of the dual control laser.

Figure 6:
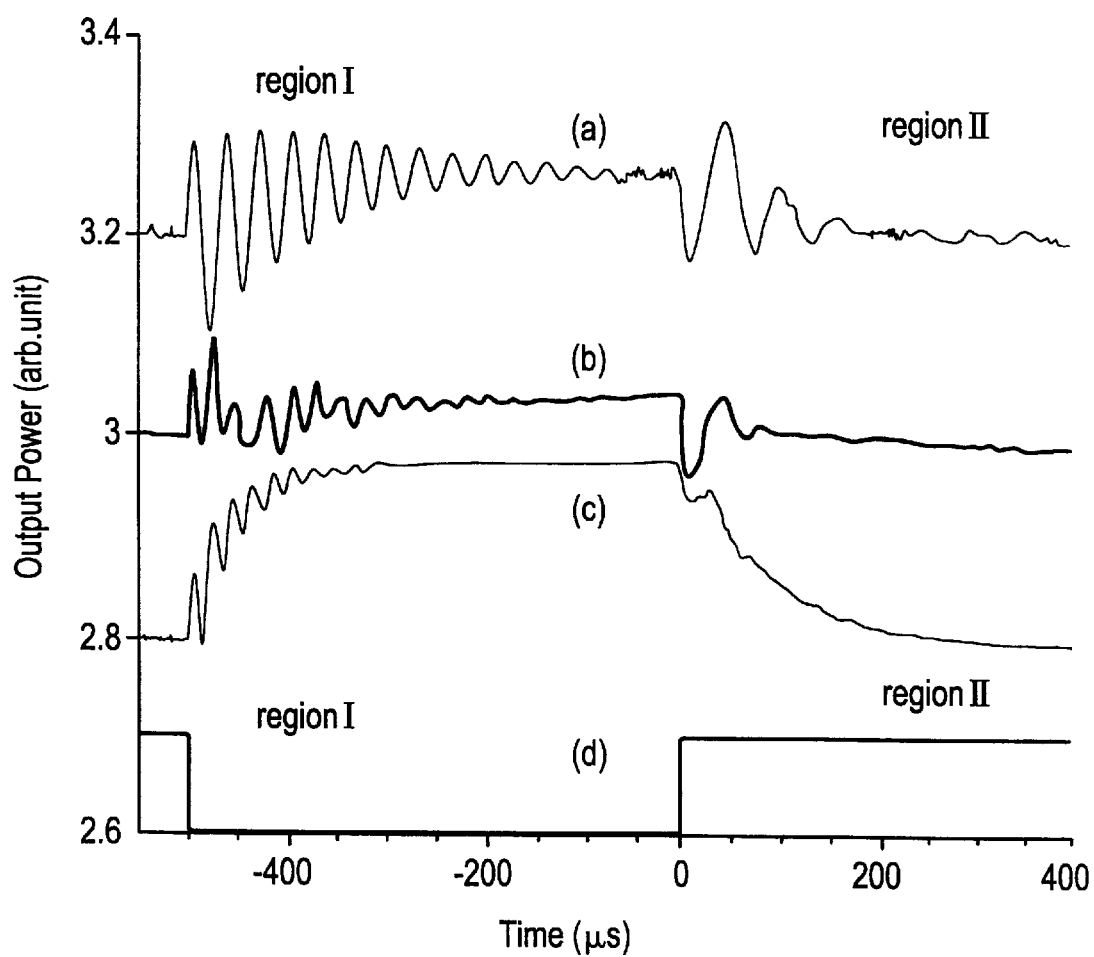
FIG. 6 is a plot of power as a function of time which shows a reduction of relaxation oscillations in accordance with an illustrative embodiment of the invention.

FIG. 6 shows the output transients of the surviving channel at $\lambda_s$ upon modulation of the $\lambda_M$ channel. The modulation pattern is shown in FIG. 6(*d*) corresponding to complete turn-off and turn-on of the $\lambda_M$ channel at 1 kHz repetition rate. Turn off occurs in region I and turn on in region II. Clearly, the dual control lasers result in the tightest control of the transient. Using the red control laser only (FIG. 6(*a*)), the transient response of the surviving channel is dominated by relaxation oscillations of the control laser. Both the oscillation frequency and the damping time are higher in the event of a drop (region I) than in the case of an add (region II) due to smaller lasing power in the former case. Using the blue control laser only (FIG. 6(*b*)), the transient response of the surviving channel is dominated by a slow change induced by spectral hole burning induced gain tilt. This leads to a steady-state increase of the output power upon drop with its amplitude exceeding the changes induced by relaxation oscillations. Using dual cavity optical gain control (FIG. 6(*c*)), we can see a dramatic reduction of the oscillation amplitude (a factor of 2), oscillation damping constant (a factor of 2), as well as a reduction of the steady-state deviation (a factor of four).

Figure 7:
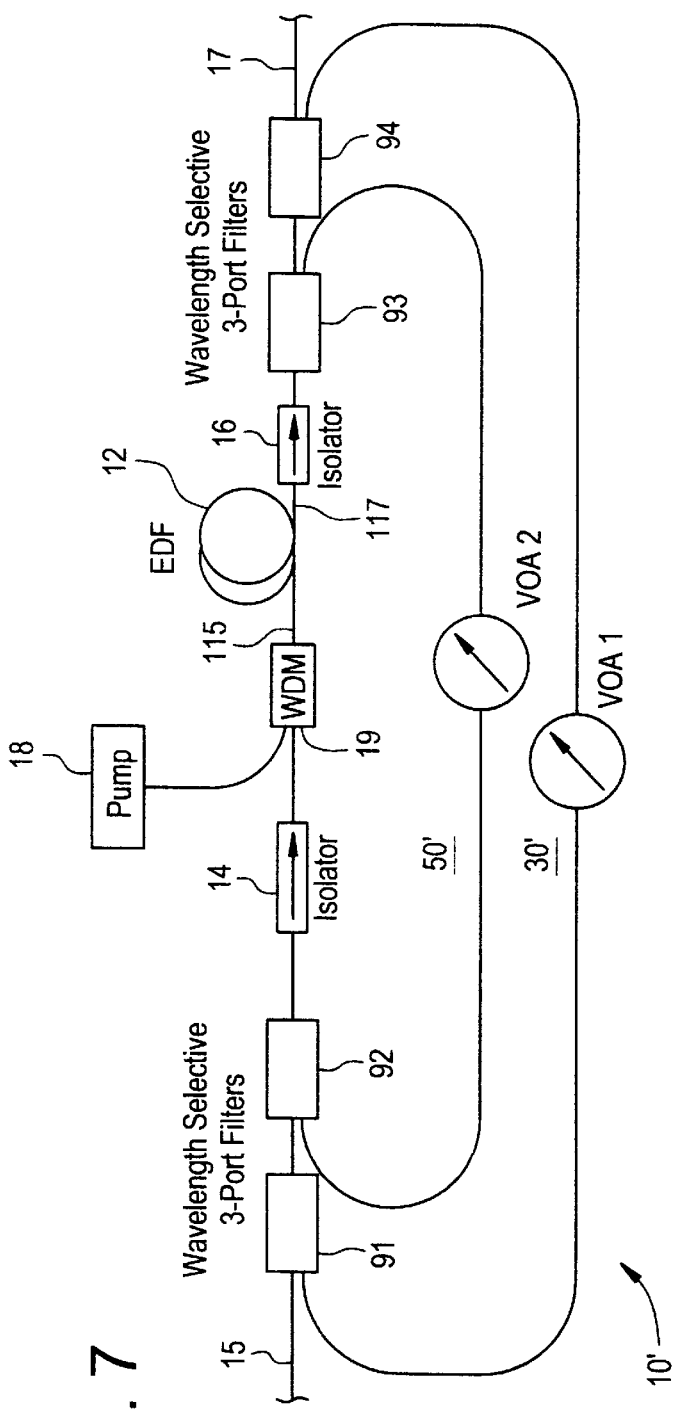
FIG. 7 schematically illustrates a dual cavity implementation of the present invention using ring cavities and wavelengths selective 3-port filters.

FIG. 7 illustrates an alternative embodiment of the optical amplifier of the present invention. In comparison to the amplifier 10 of FIG. 7, in the amplifier 10' of FIG. 3, the 3 dB couplers 32, 34, the WSM devices 36 and 42, and the tunable two port filters 54 and 40 are omitted. Instead, in FIG. 7, the wavelength selective three port filters 91, 92, 93 94 are utilized. Thus, the optical amplifier 10' of FIG. 7 comprises a gain medium in the form of EDF 12 for providing gain to an optical signal propagating therein. An input isolator 14 is coupled to an input end 115 of the EDF 12. An output isolator 16 is coupled to an output end 117 of the erbium-doped fiber 12. A pump laser 18 is coupled to the EDF 12 via the WDM19. The optical signal to be amplified enters the amplifier 10' at the input port 15 and the amplified optical signal exits the amplifier 10' at the output port 17.

The amplifier 10' includes two ring laser cavities 30' and 50'. The cavity 30' comprises the wavelength selective three-port filter 91, the EDF 12, the wavelength selective three port filter 94 and VOA1. The wavelength selective filters 91, 94 select a first wavelength such as 1530 nm. The VOA1 is adjusted to compensate the gain of EDF 12 at this wavelength. The cavity 50' comprises wavelength selective three port filter 92, the EDF12, the wavelength selective three port filter 93 and VOA2. The wavelength selective filters 92, 93 select a second wavelength such as 1565 nm. The VOA 2 is adjusted to compensate the gain of EDF 12 at this wavelength.

The three port wavelength selective filters of FIG. 7 provide less loss than the 3 dB couplers of FIG. 1. The reduced loss of this implementation results in improved output power and noise figure performance.

Figure 8:
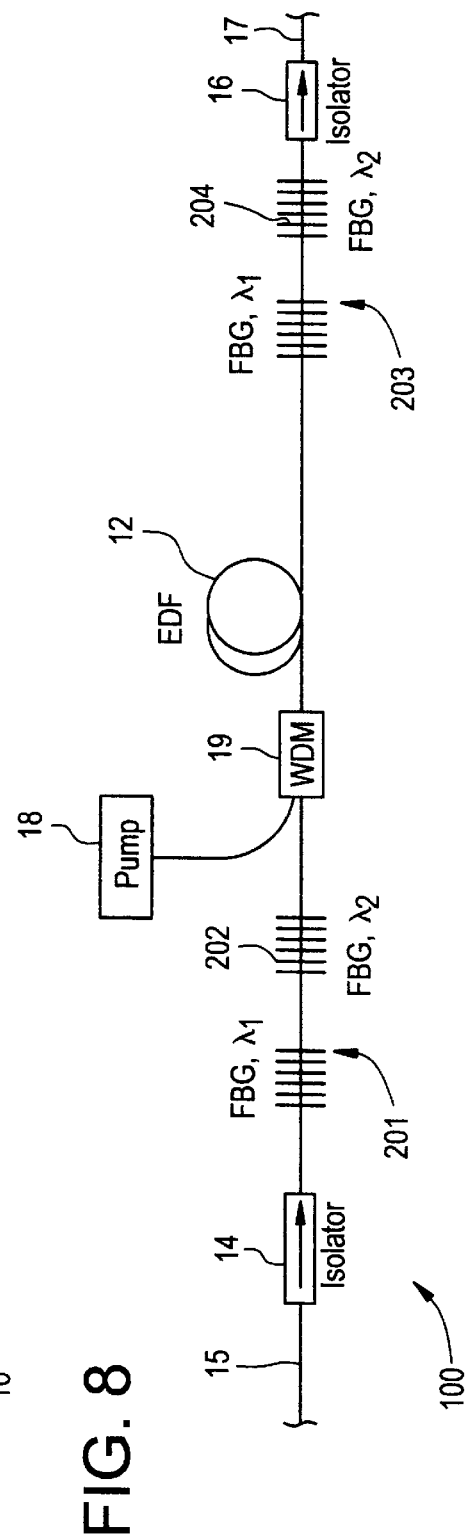
FIG. 8 schematically illustrates a dual cavity implementation using linear cavities and Fiber Bragg Gratings.

Another alternative embodiment of the invention is shown in FIG. 8. In this embodiment, control of the gain spectrum is provided by two linear laser cavities. In particular optical amplifier 100 of FIG. 8 comprises a gain medium in the form of EDF 12. A pump laser 18 is coupled to the EDF 12 via WDM 19. Input and output isolators 14 and 16 are located on either side of the EDF 12. An optical signal to be amplified enters the amplifier 100 at the input port 15 and the amplified signal exits at the output port 17. A first linear cavity which oscillates at $\lambda_1$ is defined by FBG (Fiber Bragg Grating) 201 and FBG 203. A second linear cavity which oscillates at $\lambda_2$ is defined by FBG 202 and FBG 204.

The round trip loss of the individual cavities is controlled by changing the reflectance of the FBGs on the input side of the amplifier. In other words, the reflectances of the FBGs in each linear cavity obey the following expression:

$$R_i R_o = \frac{1}{G_{RT}}$$

where $R_i$ and $R_o$ are the reflectances of the input and output FBGs and $G_{RT}$ is the round trip gain of the amplifier. If we assume that the output FBG is a high reflector, we can $$R_i = \frac{1}{G_{RT}}$$

let $R_o=1$ and the equation becomes The linear cavity system described introduces very little additional loss at the input and output of the amplifier, and as a result has an excellent output power and noise figure performance. (See e.g. G. Luo, J. L. Zyskind, J. A. Nagel, N. A. Ali; Journal of Lightware Tech. vol-16. No. 4 April 1998, p. 527. G. Luo, J. L. Zyskind, Y. Sun, A. K. Srirastava, J. W. Sulhoff, C. Wolf, M. A. Ali, IEEE Photonics Technology letters, Vol. 9, No. 10, October 1997, p. 1346. M. Zirngibl; Electronics Letters, Vol. 27, No. 7, 28 March 1991, p. 560).

Use of the multi-cavity, optically gain controlled amplifier according to the embodiments of the invention is also advantageous when used in an amplifier chain. It has been observed that transient gain errors of surviving channels at the end of an amplifier chain increase with the number of amplifiers they pass through. Multi-cavity-OAGC may be used to maintain tighter control over transient performance than single-cavity OAGC. We believe that in addition to pump power penalties associated with signal adding/dropping, spectral holeburning and relaxation oscillations of the control laser impact the applicability of single-cavity OAGC in WDM optical networks. The resulting performance degradations lead to residual transient and steady state power excursions that accumulate along EDFA cascades, resulting in system bit-error-rate penalties.

Finally, the above-described embodiments of the invention are intended to be illustrative only. Numerous alternative embodiments may be devised by those skilled in the art without departing from the scope of the following claims.

What is claimed is:

1. An optical amplifier comprising:
   a gain medium for providing gain to an optical signal propagating therein, and
   first and second laser cavities for which gain is provided by said gain medium, said first and second laser cavities simultaneously oscillating at first and second optical wavelengths.

2. The optical amplifier of claim 1 wherein said first and second simultaneously oscillating laser cavities reduce variations in a gain spectrum of said gain medium.

3. The amplifier of claim 2 wherein:
   said first laser cavity comprises a first narrow band filter which is transmissive at said first wavelength and a first optical attenuator, and
   said second laser cavity comprises a second narrow band filter which is transmissive at said second wavelength and a second optical attenuator.

4. The amplifier of claim 3 wherein said first attenuator compensates for the gain of said gain medium at said first wavelength and said second attenuator compensates for the gain of said gain medium at said second wavelength.

5. The amplifier of claim 1 wherein said gain medium is an erbium doped optical fiber.

6. The amplifier of claim 5 wherein said first wavelength is 1530 nm and said second wavelength is 1565 nm.

7. The optical amplifier of claim 2 wherein said first and second simultaneously oscillating laser cavities reduce variations in said gain spectrum when channels are added or dropped from said optical signal.

8. The optical amplifier of claim 2 wherein said first and second simultaneously oscillating laser cavities reduce variations in said gain spectrum as a function of wavelength and as a function of time.

9. The optical amplifier of claim 1 wherein said laser cavities are ring cavities.

10. The optical amplifier of claim 1 wherein said laser cavities are linear cavities.

11. An optical amplifier comprising:
    a gain medium in the form of an erbium doped optical fiber for providing gain to an optical signal propagating therein,
    a pump laser coupled to said optical fiber, and
    first and second laser cavities for which gain is provided by said optical fiber, said first cavity including a first filter transmissive at a first optical wavelength and a first optical attenuator, said second cavity including a second filter transmissive at a second optical wavelength and a second optical attenuator.

12. The optical amplifier of claim 11 wherein:
    said first laser cavity oscillates at said first optical wavelength, and
    said second laser cavity simultaneously oscillates at said second optical wavelength.

13. The optical amplifier of claim 11 wherein:
    said first optical attenuator provides an amount of attenuation sufficient to compensate for said gain of said optical fiber at said first optical wavelength, and
    said second optical attenuator provides an amount of attenuation sufficient to compensate for said gain of said optical fiber at said second optical wavelength.

14. The optical amplifier of claim 11 wherein:
    said first and second laser cavities reduce variations in a gain spectrum of said gain medium.

15. The optical amplifier of claim 11 wherein said first optical attenuator is a variable attenuator and said second optical attenuator is a variable attenuator.

16. The optical amplifier of claim 11 wherein said first wavelength is 1530 nm and said second wavelength is 1560 nm.

17. An optical amplifier comprising
    a gain medium which provides optical gain at first and second optical wavelengths,
    a first laser cavity which is provided gain at said first wavelength by said gain medium,
    a second laser cavity which is provided gain at said second wavelength by said gain medium,
    said first laser cavity comprising a first filter which is transmissive at said first wavelength and a first variable optical attenuator,
    said second laser cavity comprising a second filter which is transmissive at said second wavelength and a second optical attenuator,
    said optical gain at said first wavelength being variable by varying said first variable optical attenuator.

18. The amplifier of claim 17 wherein said second optical attenuator is a variable optical attenuator and wherein said optical gain at said second wavelength is variable by varying said second variable optical attenuator.

19. The amplifier of claim 17 wherein said gain medium is an erbium doped optical filter.

20. The amplifier of claim 17 wherein said first cavity oscillates at said first wavelength and said second cavity simultaneously oscillates at said second wavelength.

21. A method for controlling the gain at a selected wavelength of an optical gain medium that provides optical gain at a plurality of wavelengths, said method comprising the step of:

varying a variable optical attenuator in a selected one of a plurality of laser cavities for which gain is provided by said gain medium, each of said laser cavities oscillating at one of said plurality wavelengths.

22. A method according to claim 21, wherein each of said laser cavities is oscillating at a particular wavelength in said wavelength band and comprising a filter transmissive at the particular wavelength and a variable optical attenuator.

* * * * *